United States Patent
Kikuchi et al.

(10) Patent No.: US 6,321,046 B1
(45) Date of Patent: Nov. 20, 2001

(54) INDUCTION HEATING FIXING DEVICE HAVING A CENTRAL PROCESSING UNIT, AND IMAGE FORMING APPARATUS USING THE FIXING DEVICE

(75) Inventors: Kazuhiko Kikuchi, Yokohama; Tomohiro Matsunai, Kawasaki; Hiroshi Nakayama, Kawasaki; Yasuhiro Ebata, Kawasaki, all of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/473,061

(22) Filed: Dec. 28, 1999

(51) Int. Cl.[7] .................................................. G03G 15/20
(52) U.S. Cl. ............................. 399/69; 219/216
(58) Field of Search ................. 399/69, 70, 328; 219/216

(56) References Cited

U.S. PATENT DOCUMENTS 5,752,150   5/1998  Kato et al. ......................... 399/330
5,794,096 * 8/1998  Okabayashi ........................ 219/216
5,911,094 * 6/1999  Tsujimoto ............................ 399/69

* cited by examiner

Primary Examiner—Quana M. Grainger
(74) Attorney, Agent, or Firm—Foley & Lardner

(57) ABSTRACT

A fixing device in an image forming apparatus having various functions such as print data reception, FAX transmission/reception, and the like, has a member to be heated (1), an excitation coil (2) which is arranged in the vicinity of the member to be heated (1), and heats the member to be heated (1) by induction upon receiving a current, an induction heating control circuit (7) for controlling current supply to the excitation control (2), and a main body control circuit (14) for controlling the operation of the image forming apparatus main body. The induction heating control circuit (7) has a central processing unit (9) independently of the main body control circuit (14). The main body control circuit 14 can control the excitation control 92 by supplying a heating ON/OFF signal to the central processing unit without directly controlling current supply to the excitation coil (2). For this reason, a lamp heating means can be used in place of an induction heating means without changing any hardware components of the image forming apparatus main body including the main body control circuit 14.

8 Claims, 5 Drawing Sheets

| PIN NUMBER | SIGNAL NAME | CONTENTS | DIRECTION | DEFINITION | |
|---|---|---|---|---|---|
| 1 | POW CNT3 | POWER CONTROL SIGNAL | OUT | 000 | 700W |
| | | | | 001 | 800W |
| | | | | 010 | 850W |
| 2 | POW CNT2 | | | 011 | 900W |
| | | | | 100 | 1000W |
| 3 | POW CNT1 | | | 101 | 1100W |
| | | | | 110 | 1200W |
| | | | | 111 | 1300W |
| 4 | DUTY ON/OFF | HEATING ON/OFF SIGNAL | OUT | | |
| 5 | ERR STS2 | ABNORMALITY DETECTION SIGNAL | IN | 00 | INITIAL CHECK IN PROGRESS |
| | | | | 01 | READY |
| | | | | 10 | COIL ABNORMALITY |
| 6 | ERR STS1 | | | 11 | CIRCUIT ABNORMALITY |
| 7 | SLEEP | SLEEP SIGNAL | OUT | | |
| 8 | VDD | POWER SUPPLY VOLTAGE | OUT | | |

INDUCTION HEATING FIXING DEVICE HAVING A CENTRAL PROCESSING UNIT, AND IMAGE FORMING APPARATUS USING THE FIXING DEVICE

BACKGROUND OF THE INVENTION

The present invention relates to an image forming apparatus and, more particularly, to an induction heating fixing device which uses an induction heating means as a heating source, and an image forming apparatus using the fixing device.

A fixing device which is related to the present invention uses a halogen lamp or the like as a heating source. The lamp is arranged inside a heat roller to heat it. A press roller is pressed against the heat roller and rotated so as to bring the print medium into press contact with the heat roller, and a paper sheet is passed between the two rollers.

FIG. 8 shows a schematic structure of the overall fixing device. A halogen lamp 102 is arranged inside a thin, metal heat roller 101. An elastic member is formed on the surface of a press roller 103 to make the print medium in sufficient press contact with the heat roller 101. The heat roller 101 and press roller 103 are supported while being applied with a predetermined pressure by a compression mechanism (not shown). Furthermore, the heat roller 101 and press roller 103 are rotated by a drive source (not shown) in the directions of arrows at the same speed as the convey speed of the print medium.

The fixing device using the halogen lamp 102 suffers poor thermal efficiency, and it is hard to reduce consumption power. Also, a long warm-up time is required from when the power supply is turned on until the heat roller 101 reaches the temperature required for fixing operation.

SUMMARY OF THE INVENTION

It is, therefore, an object of the present invention to provide a fixing device which can attain high thermal efficiency and power savings, and quickly becomes ready to start fixing operation after power ON, by a simple method.

According to the present invention, there is provided a fixing device used in an image forming apparatus, comprising a main body control circuit for controlling operation of the overall image forming apparatus, a member to be heated, an excitation coil which is arranged in the vicinity of the member to be heated and heats the member to be heated by induction upon receiving a current, and an induction heating control circuit for controlling current supply to the excitation coil, wherein the induction heating control circuit has a central processing unit independently of the main body control circuit so as to be able to control current supply to the excitation coil independently of control of the operation of the overall image forming apparatus by the main body control circuit.

The fixing device may further comprise an excitation circuit for supplying a high-frequency current to the excitation coil, and a control circuit for controlling operation of the excitation circuit, and the central processing unit of the induction heating control circuit may control supply of the high-frequency current to the excitation coil by controlling the operation of the control circuit on the basis of a heating ON/OFF signal supplied from the main body control circuit.

A fixing device according to the present invention is a fixing device used in an image forming apparatus, comprising a main body control circuit for controlling operation of the overall image forming apparatus, a member to be heated, an excitation coil which is arranged in the vicinity of the member to be heated and heats the member to be heated by induction upon receiving a current, an induction heating control circuit which has a central processing unit independent from the main body control circuit, and controls current supply to the excitation coil, and a sensor for detecting a temperature of the member to be heated, wherein the main body control circuit detects the temperature of the member to be heated using the sensor at the beginning of current supply to the member to be heated, and supplies a power control signal to the induction heating control circuit to obtain a power supply output on the basis of the detected temperature.

The main body control circuit preferably selects a lower power supply output as the temperature detected by the sensor becomes higher.

An image forming apparatus according to the present invention comprises a main body control circuit for controlling operation of the overall image forming apparatus, a member to be heated, an excitation coil which is arranged in the vicinity of the member to be heated and heats the member to be heated by induction upon receiving a current, an induction heating control circuit which has a central processing unit independent from the main body control circuit, and controls current supply to the excitation coil, and sleep mode setting means for, when the image forming apparatus remains non-operated for not less than a predetermined period of time, setting the image forming apparatus in a sleep mode having lower consumption power than a normal state, wherein when a request for operating the image forming apparatus is generated while the image forming apparatus is set in the sleep mode by the sleep mode setting means, the main body control circuit supplies a heating ON/OFF signal to the central processing unit of the induction heating control circuit in correspondence with a type of generated request, and initializes required mechanisms of the image forming apparatus in accordance with the type of generated request.

The image forming apparatus preferably further comprises a mechanism including a scanner and a document feeder required for FAX transmission, and when a FAX transmission request is generated while the image forming apparatus is set in the sleep mode, the main body control circuit initializes only the scanner and the document feeder.

The image forming apparatus further comprises a paper feed mechanism, process mechanism, scanner, and document feeder, and having an original copy function, FAX transmission/reception function, and image data print function, when the image forming apparatus is set in the sleep mode, the main body control circuit stops the paper feed mechanism, the process mechanism, the scanner, and the document feeder, and supplies an OFF signal to the induction heating control circuit, when a copy request is generated while the image forming apparatus is set in the sleep mode, the main body control circuit initializes the paper feed mechanism, the process mechanism, the scanner, and the document feeder, and supplies an ON signal to the induction heating control circuit, when a FAX transmission request is generated while the image forming apparatus is set in the sleep mode, the main body control circuit initializes the scanner and the document feeder, and when a FAX reception or image data print request is generated while the image forming apparatus is set in the sleep mode, the main body control circuit initializes the paper feed mechanism and the process mechanism, and supplies an ON signal to the induction heating control circuit.

BRIEF DESCRIPTION OF THE DRAWINGS

FIG. 4 is a graph showing different heat roller temperatures after heating depending on the heat roller temperature upon power ON;

FIG. 6 is a flow chart showing the sequence for controlling the power supply output in correspondence with the heat roller temperature upon power ON;

DESCRIPTION OF THE PREFERRED EMBODIMENT

The preferred embodiment of the present invention will be described hereinafter with reference to the accompanying drawings.

This embodiment uses an induction heating means as a means for heating a member to be heated. Furthermore, this embodiment comprises an arrangement capable of selecting one of a heating means by means of a lamp such as a halogen lamp or the like, and the induction heating means without changing any hardware components.

Figures 1, 2:
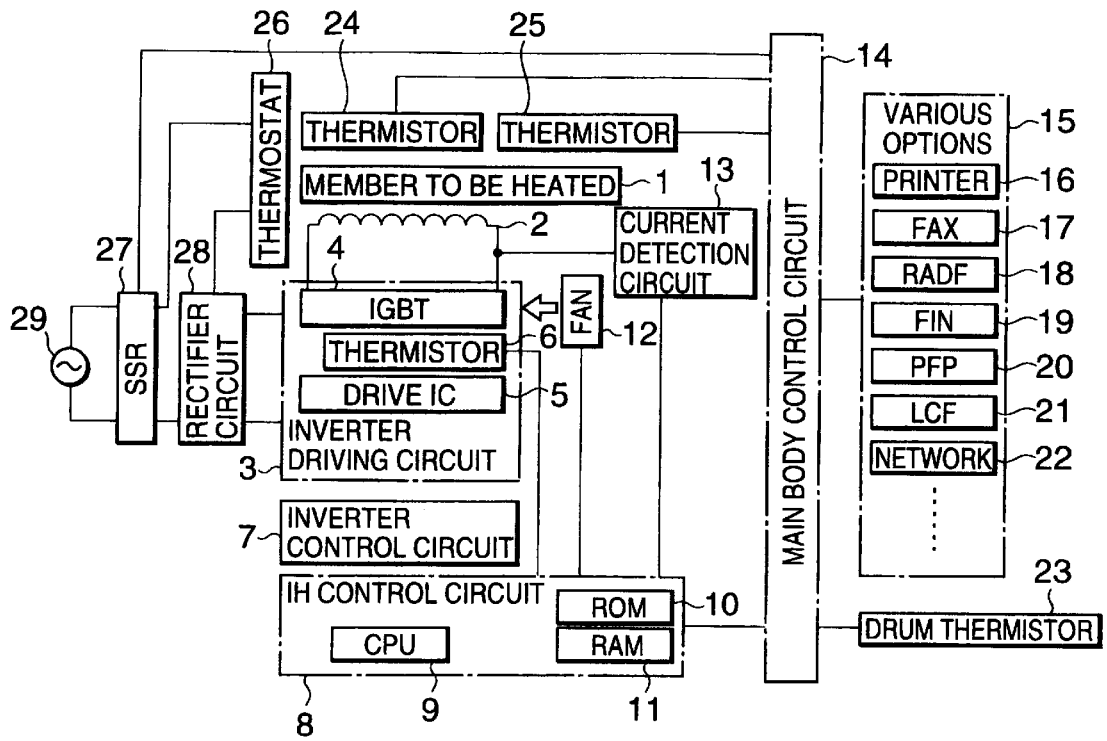
FIG. 1 is a block diagram showing the arrangement of a fixing device according to an embodiment of the present invention.
FIG. 2 is an explanatory view showing various signals exchanged between a main body control circuit and IH control circuit in the fixing device shown in FIG. 1.

FIG. 1 shows the arrangement of a control circuit for controlling supply of an RF current to an excitation coil 2 in a fixing device of this embodiment.

An SSR (Solid State Relay) 27 is connected to a power supply 29, and is also connected to an inverter driving circuit 3 via a thermostat 26 and rectifier circuit 28.

The inverter driving circuit 3 has an IGBT (Insulated Gate Bi-Polar Transistor) 4 which corresponds to an excitation circuit, and controls to turn on/off supply of an RF current to the excitation coil 2, and a drive IC 5 which controls to turn on/off the IGBT 4.

The inverter driving circuit 3 is connected to an inverter control circuit 7 which controls the driving operation of the circuit 3.

A current detection circuit 13 is connected to the excitation coil 2 to measure the RF current supplied to the excitation coil 2. A thermistor 6 is arranged in the vicinity of the IGBT 4 to detect ambient temperature. The IGBT 4 is ventilated by a fan 12 as needed to be prevented from being overheated.

A thermistor 24 is disposed in the vicinity of an end portion of a member 1 to be heated, and a thermistor 25 in the vicinity of the center of the member 1.

The inverter control circuit 7, current detection circuit 13, fan 12, and thermistor 6 are connected to an IH control circuit 8, which controls the operations of these circuits. The IC control circuit 8 has a CPU (Central Processing Unit) 9, ROM (Read Only Memory) 10, and RAM (Random Access memory) 11. The ROM 10 pre-stores a program required for induction heating control, and the CPU 9 controls according to this program. The RAM 11 stores data required for the control process as needed.

The IH control circuit 8, thermistors 24 and 25, and SSR 27 are connected to a main body control circuit 14 that controls the overall image forming apparatus.

The main body control circuit 14 is connected to an option connection circuit 15 as an interface for connecting various optional devices. Also, a drum thermistor 23 for detecting environmental temperature around the image forming apparatus is connected to the main body control circuit 14.

Various optional devices include a printer 16, FAX 17, RADF (Reduction Auto Document Feeder) 18 for automatically feeding documents, FIN (Finisher) 19 for sorting, PFP (Paper Feeding Pedestal) 20, LCF (Large Capacitor Feeder) 21 as a large capacity paper feeding pedestal, network option 22 which allows to use the image forming apparatus as a standalone scanner, FAX, printer, or the like, and the like.

The main body control circuit 14 supplies a heating ON signal that instructs to start induction heating to the IH control circuit 8. The IH control circuit 8 controls the operation of the inverter driving circuit 7, thus supplying an RF current from the IGBT 4 to the excitation coil 2. At this time, the main body control circuit 14 selects one of required power supply outputs, e.g., 700 W, 800 W, 850 W, 900 W, 1,000 W, 1,100 W, 1,200 W, and 1,300 W, in correspondence with the temperature of the member 1 to be heated, as will be described later, and outputs a power control signal to the IH control circuit 8.

In this embodiment, the IH control circuit 8 that controls induction heating includes the CPU 9 independently of the main body control circuit 14 that controls the overall image forming apparatus. With this arrangement, the main body control circuit 14 can supply, e.g., a heating ON/OFF command to the IH control circuit 8. The IH control circuit 8 can control the induction heating means independently of the main body control circuit 14, after it receives the command.

FIG. 2 shows various signals exchanged between the main body control circuit 14 and IH control circuit 8. A power control signal is used to select electric power from 700 W to 1,300 W, and is supplied from the main body control circuit 14 to the IH control circuit 8. A heating ON/OFF signal instructs to turn on/off heating of the induction heating means, and is supplied from the main body control circuit 14 to the IH control circuit 8. An abnormality detection signal is generated upon detecting coil abnormality, thermistor abnormality, or circuit operation abnormality, and is output from the IH control circuit 8 to the main body control circuit 14. A sleep signal indicates that the image forming apparatus has gone to sleep since it was non-operated for a predetermined period of time, as will be described later, and is supplied from the main body control circuit 14 to the IH control circuit 8.

Figure 3:
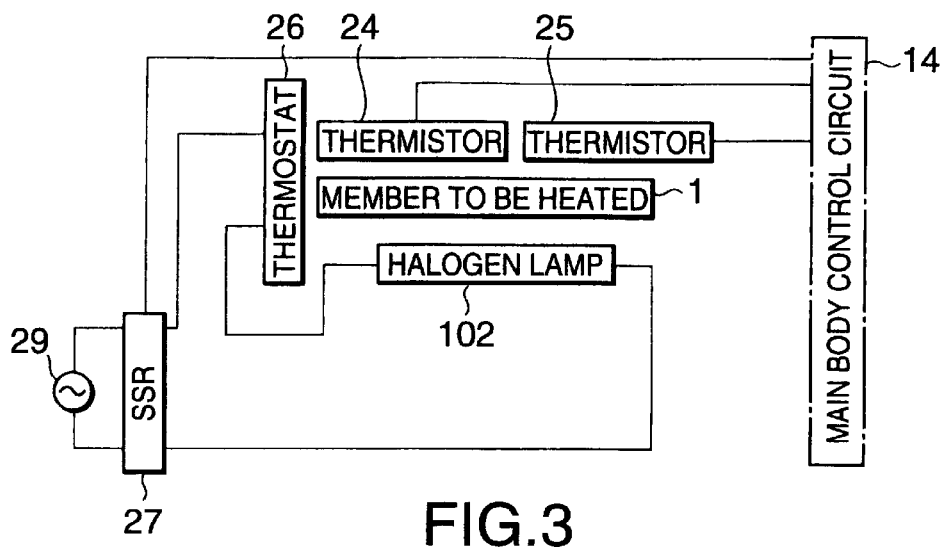
FIG. 3 is a block diagram showing the arrangement when an induction heating means in the fixing device shown in FIG. 1 is replaced by a lamp heating means.

With this arrangement, a lamp heating means can be used in place of the induction heating means without changing the hardware arrangement. FIG. 3 shows the arrangement at that time.

The SSR 27 is connected to the power supply 29, and is also connected to a halogen lamp 102 via the thermostat 26.

The member 1 to be heated is heated by the halogen lamp 102. The temperatures at the end and central portions of the member 1 to be heated are respectively measured by the two thermistors 24 and 25.

Also, the control terminal of the SSR 27 is connected to the output terminal of the main body control circuit 14, thereby controlling power supply to the halogen lamp 102 under the control of the main body control circuit 14.

When the halogen lamp 102 is used, thermal efficiency is low and large electric power is consumed, as described above. Also, a long time is required from power ON until the temperature of a heat roller 101 rises to that required for the fixing operation. However, the cost of the overall apparatus that uses the lamp heating apparatus can be lower than that using the induction heating means.

Hence, it is beneficial for the user if he or she can select which one of these heating means to use without changing the hardware arrangement.

When constant electric power is supplied to the induction or lamp heating means irrespective of the temperature of the member 1 to be heated, the temperature upon overshooting may exceed the allowable range. Especially, in recent years, in order to shorten the warm-up time from power ON until the device is ready to start the fixing operation, the thickness and diameter of the member 1 to be heated are decreased. In such state, when the member 1 to be heated has been heated to some extent upon power ON and the temperature is higher than 0° C, if constant electric power is supplied to the heating means, excessive overshoot readily takes place.

Figure 4:
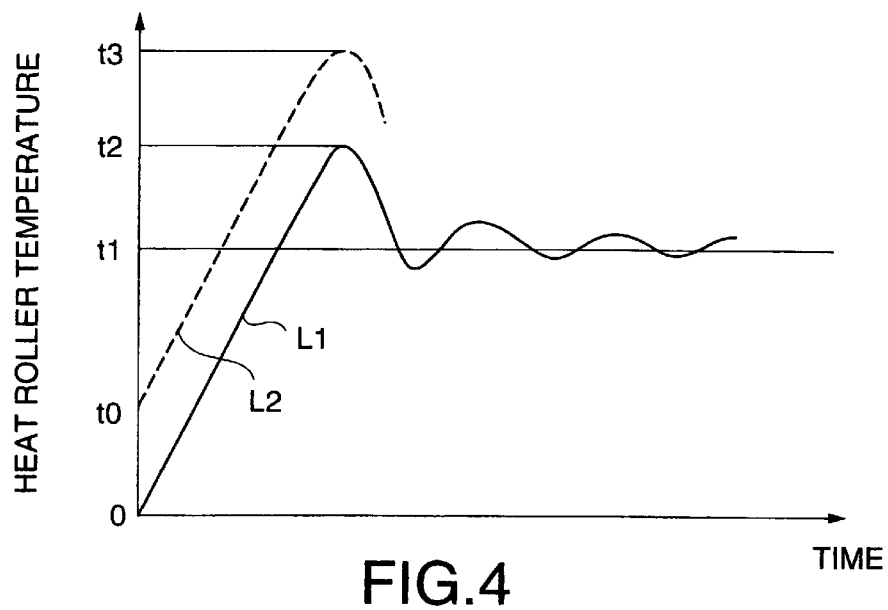

As indicated by a solid curve L1 in FIG. 4, when the temperature of the member 1 to be heated upon power ON is 0° C., temperature t2 upon overshooting falls within the allowable range with respect to temperature t1 in a steady state. However, when the member to be heated has certain temperature t0 upon power ON, the temperature rises, as indicated by a dotted curve L2 having the same gradient as that of the curve L1, and overshoots temperature t3 exceeding the allowable range.

In this embodiment, the thermistors 24 and 25 are mounted in the vicinity of the member 1 to be heated to detect its temperature, and optimal electric power is selected from 700 W to 1,300 W in accordance with the detected temperature. More specifically, upon receiving the outputs from the thermistors 24 and 25, the main body control circuit 14 selects one electric power on the basis of the detected temperature, and outputs a power control signal to the IH control circuit 8.

Figure 5:
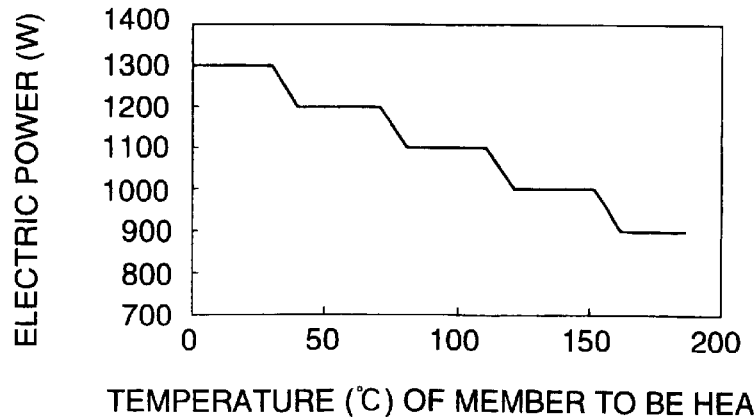
FIG. 5 is a graph showing the relationship between the heat roller temperature upon power ON and the power supply output in the fixing device shown in FIG. 1.

FIG. 5 shows the relationship between the temperature of the member 1 to be heated, and electric power. One electric power value is selected in correspondence with the temperature of the member 1 to be heated in accordance with this graph.

Figure 6:
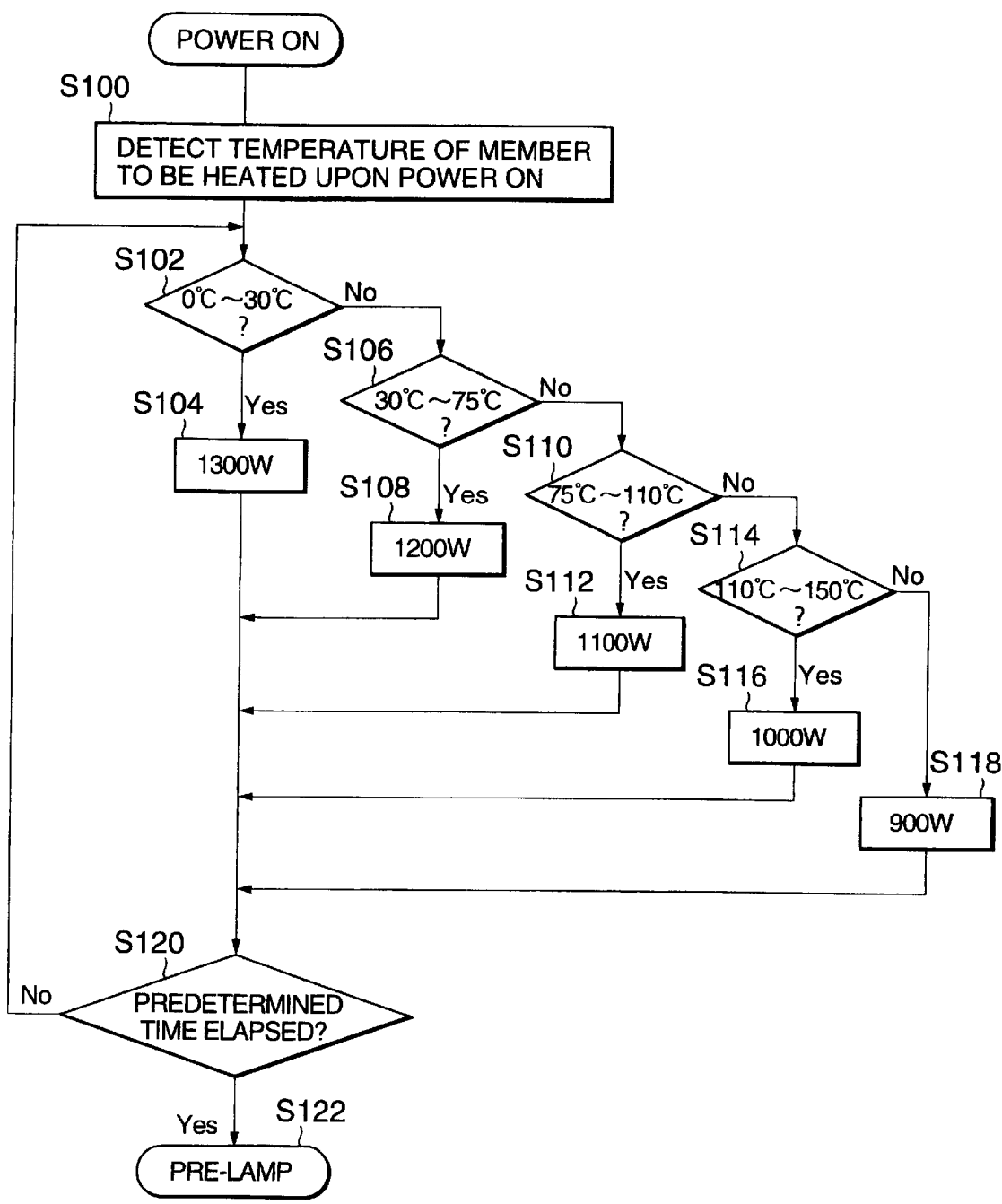

FIG. 6 is a flow chart showing the sequence of the process executed at that time. In step S100, the temperature of the member 1 to be heated upon power ON is measured. It is checked in step S102 if the temperature of the member 1 to be heated falls within the range from 0° C. to 30° C. If YES in step S102, electric power=1,300 W is selected in step S104. Likewise, it is checked in step S106 if the temperature of the member 1 to be heated falls within the range from 30° C. to 75° C. If YES in step S106, electric power=1,200 W is selected in step S108. It is checked in step S110 if the temperature of the member 1 to be heated falls within the range from 75° C. to 110° C. If YES in step S110, electric power=1,100 W is selected in step S112. Furthermore, it is checked in step S114 if the temperature of the member 1 to be heated falls within the range from 110° C. to 150° C. If YES in step S114, electric power=1,000 W is selected in step S116. If NO in step S114, i.e., if the temperature of the member 1 to be heated is 150° C. or higher, electric power=900 W is selected in step S118. It is then checked in step S120 if a predetermined time has elapsed after the selected electric power was supplied. If YES in step S120, the drum is rotated without any fixing operation as a pre-lamp process in step S122, thus making the temperature uniform.

Such variable electric power control corresponding to the temperature of the member 1 to be heated is effective for preventing the member 1 to be heated from being overheated when either the lamp heating means or induction heating means is used. Especially, when the induction heating means is used, since the temperature of the member 1 to be heated rises quickly, it is effective to variably control electric power.

Also, abnormalities such as coil abnormality, thermistor abnormality, and the like are detected on the basis of the detected temperature. In such abnormality detection process, since a slow temperature gradient can be set by selecting electric power by detecting the temperature of the member 1 to be heated upon power ON, abnormalities can be detected reliably by accurately detecting the temperature.

The fixing device enters a sleep mode when it has not been operated for a predetermined period of time. Especially, when the induction heating means is used, since the warm-up time is as short as, e.g., 30 sec or less, it is possible to turn off all mechanisms by setting the sleep mode and to wait for the next process.

After that, when a given process is started, if all the mechanisms are initialized, electric power is wasted. In this embodiment, only required mechanisms corresponding to the contents of the process to be started are initialized. For example, when a FAX transmission key has been pressed in the sleep mode, only the scanner and DF (Document Feeder) are initialized, and other unnecessary mechanisms, e.g., the engine on the main body side which includes the paper feed mechanism, drum process, and fixing mechanism, are turned off.

Figure 7:
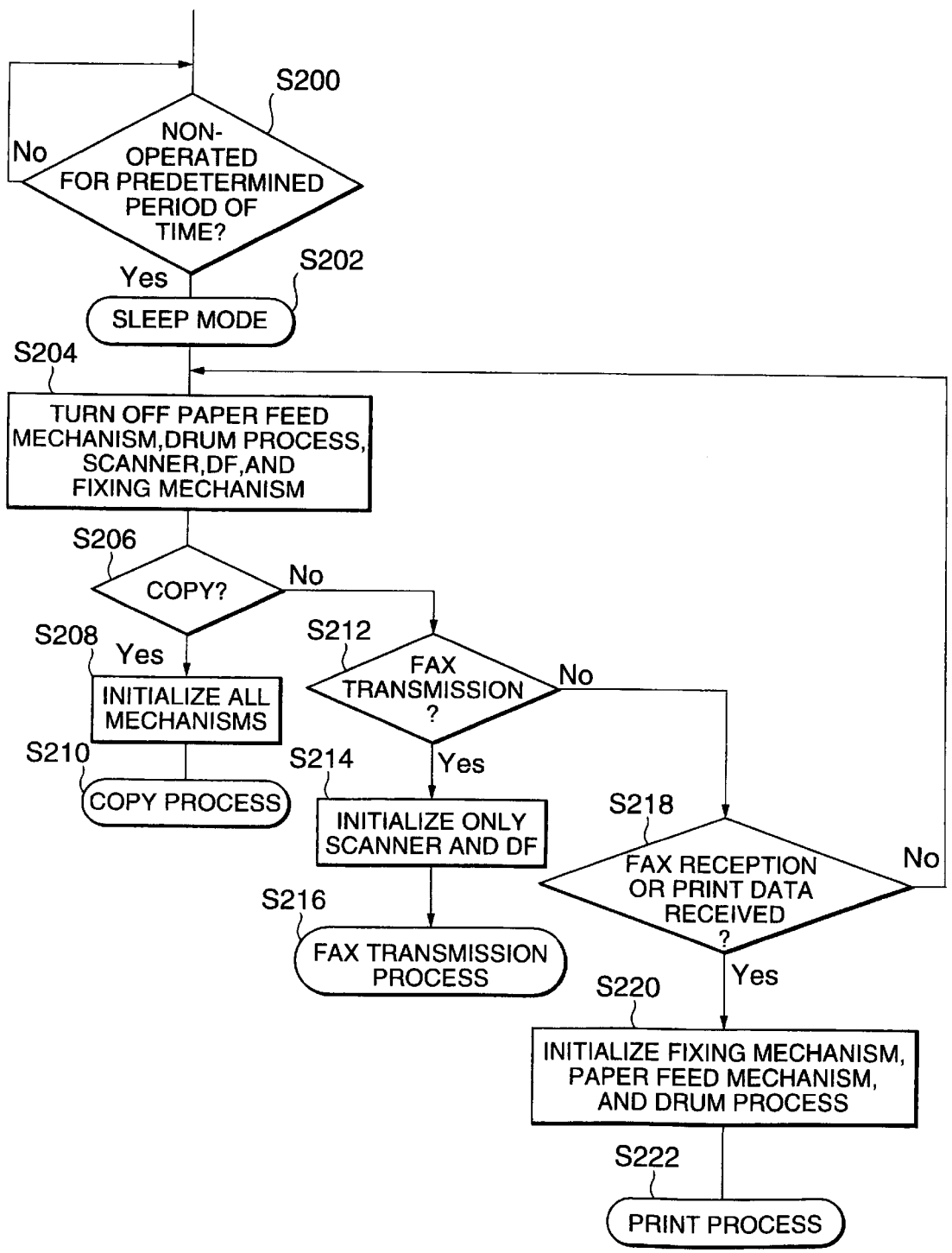
FIG. 7 is a flow chart showing the objects to be initialized upon executing a copy process, FAX transmission process, or FAX or print data reception process in a sleep mode.
Figure 8:
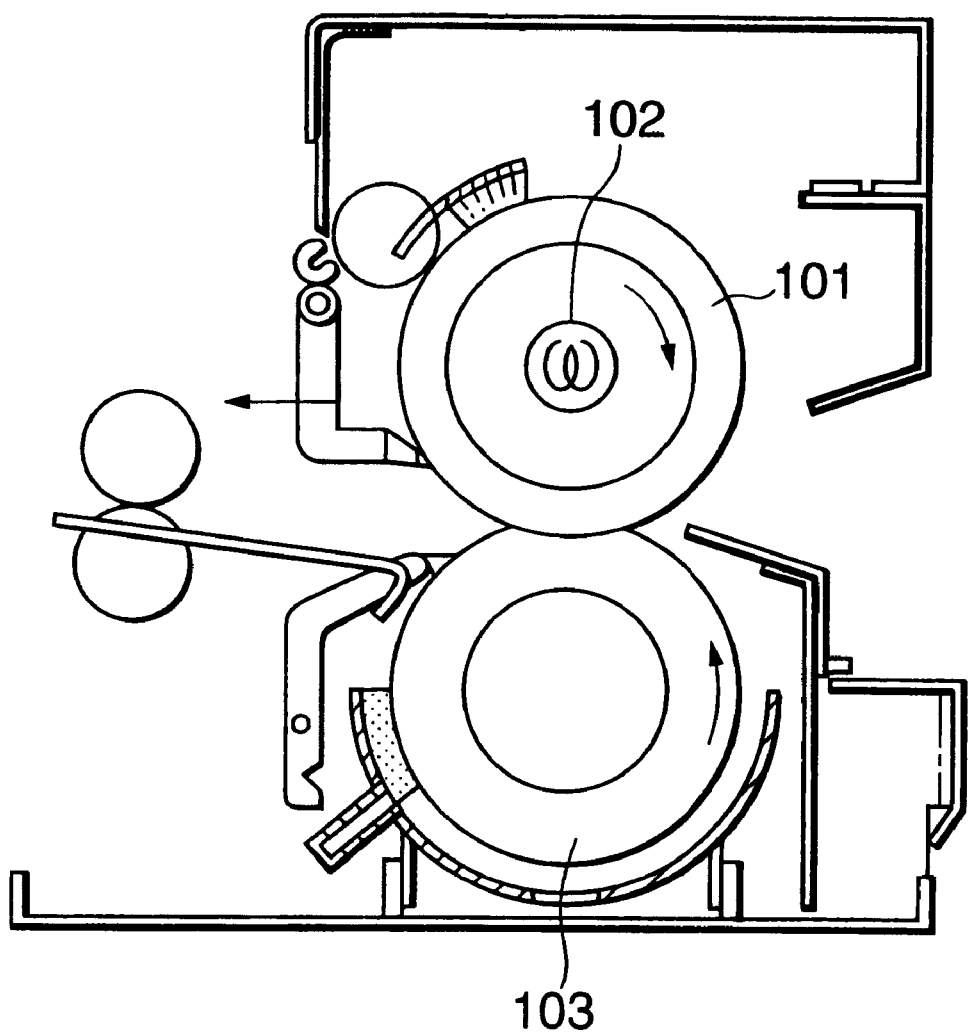
FIG. 8 is a longitudinal sectional view showing a schematic structure of an image forming apparatus having a fixing device which is related to the present invention.

As shown in FIG. 7, it is checked in step S200 if the device has been non-operated for a predetermined period of time. If YES in step S200, the sleep mode is started instep S202. In the sleep mode, all of the paper feed mechanism, drum process, DF, and fixing mechanism are turned off in step S204.

If it is determined in step S206 that a copy key has been pressed, operations of all the mechanisms are required. All the mechanisms are initialized in step S208, and a copy process is done in step S210.

If it is determined in step S212 that a FAX transmission key has been pressed, only mechanisms required for FAX transmission, i.e., only the scanner and DF, are initialized in step S214. Then, FAX transmission is done in step S216.

If it is determined in step S218 that incoming FAX or print data has arrived, mechanisms required for receiving the incoming FAX or print data, i.e., the fixing mechanism, paper feed mechanism, and drum process, are initialized in step S220. In step S222, incoming FAX or print data is received.

In this manner, by initializing only mechanisms required for each process, electric power can be prevented from being wasted.

As described above, the thermistor 6 is arranged in the vicinity of the IGBT 4 to detect the temperature of the IGBT 4. In this embodiment, the fan 12 is rotated as needed in accordance with the temperature of the IGBT 4, thus reducing consumption power and noise. On the other hand, when the temperature of the IGBT 4 has exceeded a predetermined temperature, the IGBT 4 is turned off to stop current supply to the excitation coil 2.

The aforementioned embodiment is merely an example, and does not limit the present invention. For example, the arrangement shown in FIG. 1 as that when the induction heating means is used, and the arrangement shown in FIG.

2 as that when the lamp heating means is used are examples, which may be variously modified as needed.

What is claimed is:

1. An induction heating fixing device used in an image forming apparatus, comprising:
    a first CPU for controlling operation of the overall said image forming apparatus;
    a member to be heated;
    a sensor, connected to said first CPU, for detecting a temperature of the heated member;
    an excitation coil, arranged in the vicinity of the heated member, for heating the heated member by induction upon receiving a current; and
    an induction heating control circuit for controlling current supply to said excitation coil;
    a second CPU for controlling operation of said induction heating control circuit independent of the control of said first CPU; and
    wherein said first CPU outputs a heating ON/OFF signal according to the temperature detected by said sensor, said second CPU controls the operation of said induction heating control circuit on the basis of the heating ON/OFF signal.

2. The device according to claim 1, further comprising:
    an excitation circuit for supplying a high-frequency current to said excitation coil; and
    a control circuit for controlling operation of said excitation circuit, and
    wherein said second CPU controls supply of the high-frequency current to said excitation coil by controlling the operation of said control circuit on the basis of the heating ON/OFF signal output from said first CPU.

3. An induction heating fixing device used in an image forming apparatus, comprising:
    a first CPU for controlling operation of the overall said image forming apparatus;
    a member to be heated;
    a thermistor, connected to said first CPU, for detecting a temperature of the heated member;
    an excitation coil, arranged in the vicinity of the heated member, for heating the heated member by induction upon receiving a current; and
    an induction heating control circuit for controlling current supply to said excitation coil;
    a second CPU for controlling operation of said induction heating control circuit independent of the control of said first CPU; and
    wherein said first CPU outputs a heating ON/OFF signal according to the temperature detected by said thermistor, said second CPU controls the operation of said induction heating control circuit on the basis of the heating ON/OFF signal, and said first CPU obtains the temperature of the heated member, detected by said thermistor at the start of current supply to said excitation coil, and supplies a power control signal to said induction heating control circuit to obtain a power supply output on the basis of the detected temperature.

4. The device according to claim 3, wherein said first CPU selects a lower power supply output as the temperature detected by said thermistor becomes higher.

5. An image forming apparatus comprising:
    a main body control circuit for controlling operation of the overall image forming apparatus;
    a member to be heated;
    an excitation coil which is arranged in the vicinity of said member to be heated and heats said member to be heated by induction upon receiving a current;
    an induction heating control circuit which has a central processing unit independent from said main body control circuit, and controls current supply to said excitation coil; and
    sleep mode setting means for, when said image forming apparatus remains non-operated for not less than a predetermined period of time, setting said image forming apparatus in a sleep mode having lower consumption power than a normal state,
    wherein when a request for operating said image forming apparatus is generated while said image forming apparatus is set in the sleep mode by said sleep mode setting means, said main body control circuit supplies a heating ON/OFF signal to the central processing unit of said induction heating control circuit in correspondence with a type of generated request, and initializes required mechanisms of said image forming apparatus in accordance with the type of generated request.

6. The apparatus according to claim 5, further comprising a mechanism including a scanner and a document feeder required for FAX transmission, and
    wherein when a FAX transmission request is generated while said image forming apparatus is set in the sleep mode, said main body control circuit initializes only the scanner and the document feeder.

7. The apparatus according to claim 5, further comprising a paper feed mechanism, process mechanism, scanner, and document feeder, and having an original copy function, FAX transmission/reception function, and image data print function, and
    wherein when said image forming apparatus is set in the sleep mode, said main body control circuit stops said paper feed mechanism, said process mechanism, said scanner, and said document feeder, and supplies an OFF signal to said induction heating control circuit,
    when a copy request is generated while said image forming apparatus is set in the sleep mode, said main body control circuit initializes said paper feed mechanism, said process mechanism, said scanner, and said document feeder, and supplies an ON signal to said induction heating control circuit,
    when a FAX transmission request is generated while said image forming apparatus is set in the sleep mode, said main body control circuit initializes said scanner and said document feeder, and
    when a FAX reception or image data print request is generated while said image forming apparatus is set in the sleep mode, said main body control circuit initializes said paper feed mechanism and said process mechanism, and supplies an ON signal to said induction heating control circuit.

8. An induction heating fixing device used in an image forming apparatus, comprising:
    a first CPU for controlling operation of the overall said image forming apparatus;
    a member to be heated;
    a thermistor, connected to the first CPU, for detecting a temperature of the heated member,
    an excitation coil, arranged in the vicinity of the heated member, for heating the heated member by induction upon receiving a current;
    an induction heating control circuit for controlling current supply to the excitation coil; and a second CPU for controlling operation of the induction heating control circuit;

wherein the first CPU controls power supply to the induction heating control circuit according to the temperature detected by the thermistor and the second CPU controls current supply to the excitation coil.

* * * * *